(12) United States Patent
Mizutaki et al.

(10) Patent No.: US 11,643,567 B2
(45) Date of Patent: *May 9, 2023

(54) INK SET AND INK JET RECORDING APPARATUS (71) Applicant: Seiko Epson Corporation, Tokyo (JP)

(72) Inventors: Yusuke Mizutaki, Shiojiri (JP); Kiyomi Kumamoto, Shiojiri (JP)

(73) Assignee: SEIKO EPSON CORPORATION (*) Notice: Subject to any disclaimer, the term of this patent is extended or adjusted under 35 U.S.C. 154(b) by 345 days.

This patent is subject to a terminal disclaimer.

(21) Appl. No.: 16/872,472

(22) Filed: May 12, 2020

(65) Prior Publication Data
US 2020/0362184 A1 Nov. 19, 2020

(30) Foreign Application Priority Data

May 13, 2019 (JP) .............................. JP2019-090456

(51) Int. Cl.
C09D 11/326 (2014.01)
C09D 11/328 (2014.01)
(Continued)

(52) U.S. Cl.
CPC ........... *C09D 11/326* (2013.01); *B41J 2/1433* (2013.01); *B41J 2/17523* (2013.01);
(Continued)

(58) Field of Classification Search
CPC ........... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538;
(Continued)

(56) References Cited

U.S. PATENT DOCUMENTS

2003/0193555 A1 10/2003 Koga et al.
2003/0227529 A1* 12/2003 Hosono ................ B41J 11/0065
347/36
(Continued)

FOREIGN PATENT DOCUMENTS

JP 2003-246949 A 9/2003
JP 2005-314443 A 11/2005
(Continued)

*Primary Examiner* — Manish S Shah
(74) *Attorney, Agent, or Firm* — Harness, Dickey & Pierce, P.L.C.

(57) ABSTRACT

An ink set according to an aspect of the present disclosure includes a first ink and a second ink, the ink set described above is used for an ink jet recording apparatus which includes a recording head having at least one first ejection port which ejects the first ink and at least one second ejection port which ejects the second ink; and a cap which collectively caps the first ejection port and the second ejection port, the first ink contains water and a self-dispersible pigment, and the second ink contains water, a water-soluble dye, and a pigment dispersant.

11 Claims, 2 Drawing Sheets (51) Int. Cl.
*C08L 33/08* (2006.01)
*C08L 71/02* (2006.01)
*C08K 9/00* (2006.01)
*B41J 2/14* (2006.01)
*B41J 2/175* (2006.01)
*C08K 3/04* (2006.01)
*B41J 2/21* (2006.01)
*C09D 11/40* (2014.01)

(52) U.S. Cl.
CPC .............. *B41J 2/2107* (2013.01); *C08K 3/04* (2013.01); *C08K 9/00* (2013.01); *C08L 33/08* (2013.01); *C08L 71/02* (2013.01); *C09D 11/328* (2013.01); *C09D 11/40* (2013.01); *C08K 2201/006* (2013.01)

(58) Field of Classification Search
CPC .............. B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 2004/0233263 A1* | 11/2004 | Goto | C09D 11/40 347/100 |
| 2005/0235868 A1 | 10/2005 | Goto et al. | |
| 2005/0279246 A1* | 12/2005 | Ohira | C09D 11/40 106/31.86 |
| 2010/0056704 A1* | 3/2010 | Iwamura | C09D 11/40 347/100 |
| 2010/0242794 A1* | 9/2010 | Nagano | C09D 11/322 106/31.85 |
| 2011/0187770 A1* | 8/2011 | Aoyama | C09D 11/38 347/100 |
| 2011/0292108 A1* | 12/2011 | Izumi | B41J 2/04525 347/10 |
| 2013/0002757 A1 | 1/2013 | Aruga et al. | |
| 2013/0197144 A1* | 8/2013 | Katoh | C09D 11/30 524/378 |
| 2015/0275005 A1* | 10/2015 | Okumura | C09D 11/328 106/31.43 |
| 2015/0275010 A1* | 10/2015 | Tsuzaka | C09D 11/38 106/31.6 |
| 2018/0001643 A1* | 1/2018 | Hama | C09D 11/328 |

FOREIGN PATENT DOCUMENTS

| | | |
|---|---|---|
| JP | 2006-002094 A | 1/2006 |
| JP | 2010-084136 A | 4/2010 |
| JP | 2013-010826 A | 1/2013 |
| JP | 2018-002858 A | 1/2018 |
| JP | 2018-150412 A | 9/2018 |
| JP | 2018-167462 A | 11/2018 |

* cited by examiner

INK SET AND INK JET RECORDING APPARATUS

The present application is based on, and claims priority from JP Application Ser. No. 2019-090456, filed May 13, 2019, the disclosure of which is hereby incorporated by reference herein in its entirety.

BACKGROUND

1. Technical Field

The present disclosure relates to an ink set and an ink jet recording apparatus.

2. Related Art

In an ink jet printer in which a dye ink and a pigment ink are mounted, it has been known that when the two types of inks are mixed together in the vicinity of a nozzle plate, the pigment aggregates, and hence, defects, such as nozzle clogging, may occur in some cases. Accordingly, in order to suppress the defects as described above, various methods have been investigated. For example, JP-A-2003-246949 and JP-A-2010-84136 have disclosed that in an aqueous ink set including a black ink which uses a self-dispersible pigment and a dye color ink, an additive which prevents aggregation of the self-dispersible pigment is contained in the dye color ink.

JP-A-2018-2858 and JP-A-2018-150412 have disclosed that when one cap or one maintenance unit is used for nozzles which eject at least two types of inks, defects, such as nozzle clogging, may arise in some cases.

In an ink jet printer in which a dye ink and a pigment ink are mounted, it was found that when the two types of inks are capped with one cap, a problem to be overcome is still present. In particular, the problem is that in the case in which the two types of inks are mixed in the cap, if the pigment in the pigment ink aggregates, aggregates thereof may be gradually deposited in the cap. When many aggregates are deposited in the cap, the aggregates may fall from the cap by collision with a nozzle and may stain the inside of the printer or a printed material in printing by adhesion thereto in some cases. In addition, a head nozzle surface may be stained when rubbed with the aggregate, and the printed material may also be stained in some cases when rubbed with the stained nozzle surface.

According to a related technique, although the problem which arises when the pigment is aggregated by mixing between the two types of inks in the vicinity of a nozzle plate can be overcome, the problem caused by the deposition of the aggregates in the cap described above cannot be sufficiently overcome. As the reasons for this, at least the following two points may be mentioned. The first point is that although a new ink is supplied in the cap by each capping, a liquid component of the ink thus supplied in the cap is gradually condensed by volatilization. That is, the pigment is more liable to aggregate in the cap as compared to that in the vicinity of the nozzle plate. The second point is that aggregates once generated in the cap are deposited without being removed by an ink suction device or the like coupled to the cap.

Hence, in order to sufficiently overcome the problem in that the aggregates are deposited in the cap, a countermeasure different from the technique proposed in the past is required.

SUMMARY

The present disclosure is to provide an ink set and an ink jet recording apparatus, each of which overcomes a problem in that aggregates are deposited in a cap.

According to an aspect of the present disclosure, there is provided an ink set which includes a first ink and a second ink, the ink set described above is used for an ink jet recording apparatus which comprises: a recording head having at least one first ejection port which ejects the first ink and at least one second ejection port which ejects the second ink; and a cap which collectively caps the first ejection port and the second ejection port, the first ink contains water and a self-dispersible pigment, and the second ink contains water, a water-soluble dye, and a pigment dispersant. In the ink set described above, the self-dispersible pigment of the first ink may have a specific surface area of 10 to 76 $m^2/g$. In addition, the self-dispersible pigment may be a carbon black. In addition, the first ink may contain no pigment dispersant. In addition, the first ink may contain no water-soluble dye. In addition, the pigment dispersant may include at least one selected from an acrylic copolymer, a polyoxyethylene oleyl ether, a polyoxyethylene distyrenated phenyl ether, a polyoxyethylene alkyl ether acid ester, a polyoxyethylene sorbitan monolaurate, a polyether phosphate, and sodium naphthalene sulfonate. In addition, the pigment dispersant may also include an acrylic-based resin or a polyalkylene oxide modified surfactant. In addition, the second ink may contain no pigment nor dispersible dye. In addition, in the recording head, the first ejection ports are disposed to form a first nozzle line, and the second ejection ports are disposed to form a second nozzle line, and the distance between the first nozzle line and the second nozzle line may be 4 to 8 mm. In addition, the cap comprises an absorber. In addition, in the recording head, the first ejection port and the second ejection port are provided in a nozzle plate, and the distance between the nozzle plate and the absorber of the cap may be 0.6 to 2.5 mm.

According to another aspect of the present disclosure, there is provided an ink jet recording apparatus in which an ink set including a first ink and a second ink is mounted and which ejects the first ink and the second ink, the ink jet recording apparatus comprises: a recording head having a first ejection port which ejects the first ink and a second ejection port which ejects the second ink; and a cap which collectively caps the first ejection port and the second ejection port, the first ink contains water and a self-dispersible pigment, and the second ink contains water, a water-soluble dye, and a pigment dispersant.

DESCRIPTION OF EXEMPLARY EMBODIMENTS

Hereinafter, embodiments carrying out the present disclosure will be described in detail. In addition, the present disclosure is not limited to the following embodiments and may be variously changed and/or modified within the scope of the present disclosure.

1. Ink Set

An ink set according to an embodiment of the present disclosure includes a first ink and a second ink.

1.1. First Ink

The first ink is a pigment ink containing water and a self-dispersible pigment. Hereinafter, components contained in the pigment ink will be described.

The self-dispersible pigment is a pigment capable of dispersing in an aqueous medium without using a dispersant. In this case, the "dispersing in an aqueous medium without using a dispersant" indicates a state in which without using a dispersant which disperses a pigment, the pigment is able to stably present in an aqueous medium thanks to hydrophilic groups provided on the surface of the pigment. When the self-dispersible pigment is used, since the amount of the dispersant which disperses the pigment can be reduced, foaming of an ink caused by the dispersant can be suppressed, and hence, an ink having a preferable ejection stability is likely to be prepared. In addition, since an increase in viscosity of the dispersant itself can be prevented by the use of the self-dispersible pigment, an increase in concentration of the pigment can be realized, and a high color development can also be achieved.

The self-dispersible pigment preferably has a specific surface area of 10 to 76 $m^2/g$. This specific surface area is a value calculated from the measurement using a pulse NMR. The specific surface area is a parameter indicating the polarity, that is, the hydrophilicity or the hydrophobicity, of pigment particles. As the specific surface area is increased, the hydrophilicity is increased, and the pigment is regarded to be stably dispersed in an aqueous solution. When the specific surface area is more than 76 $m^2/g$, although the storage stability is superior, since the pigment is not likely to aggregate due to a low reactivity with a sizing agent in a recording medium, the color development is inferior. On the other hand, when the specific surface area is less than 10 $m^2/g$, since the pigment is likely to aggregate due to a high reactivity with a sizing agent, although the color development is superior, the storage stability is inferior due to an increase in hydrophobic interaction between the pigment particles. In this embodiment, since the reliability can be secured even when a hydrophobic pigment, that is, a pigment having a high aggregation property, is used, a high black color density and the reliability can be simultaneously obtained.

As the self-dispersible pigment, a self-dispersible pigment surface-treated by an oxidation treatment with a hypohalous acid and/or a hypohalite, an oxidation treatment with ozone, or an oxidation treatment with persulfuric acid and/or a persulfate is preferable in terms of a high color development. By adjusting the concentration and/or the type of oxidant in the oxidation treatment, the amount of water-soluble groups introduced onto the surface of the pigment can be controlled, and the specific surface area of a pigment dispersion can be controlled.

The pigment ink is preferably used as an ink having a black color (hereinafter, referred to as "pigment black ink" in some cases), and in this case, the self-dispersible pigment is preferably a carbon black. In particular, as the self-dispersible pigment, as described above, a surface-treated carbon black is preferable in terms of a high color development.

As the pigment ink, an ink having a color other than a black color (hereinafter, referred to as "pigment color ink") may also be used. In this case, a pigment having hydrophilic groups on its surface with phenyl groups interposed therebetween is preferable in terms of a high color development. As a surface treatment method to bond the hydrophilic groups onto the pigment surface with phenyl groups interposed therebetween, various known surface treatment methods may be used, and for example, there may be mentioned a method in which sulfanilic acid, p-aminobenzoic acid, 4-aminosalicylic acid, or the like is bonded to a pigment surface so as to bond hydrophilic groups thereto with phenyl groups interposed therebetween.

The content of the self-dispersible pigment is with respect to the total mass of the pigment ink, preferably 0.1 to 20 percent by mass, more preferably 1 to 20 percent by mass, and further preferably 1 to 10 percent by mass. When the content is less than 0.1 percent by mass, in recording on a recording medium having no ink receiving layer, such as regular paper, the color development is inferior, and when the content is more than 20 percent by mass, the ink viscosity may be increased in some cases, and/or a clogging recovery property may be degraded in some cases.

The pigment ink contains water. The water functions as a main solvent which disperses or dissolves the pigment described above.

As the water, pure water, such as ion-exchanged water, ultrafiltration water, reverse osmosis water, or distilled water, or water, such as ultrapure water, in which ionic impurities are removed as much as possible is preferable. In addition, when a pigment dispersion liquid and an ink using the same are stored for a long time, water sterilized by ultraviolet irradiation or addition of hydrogen peroxide is preferably used since the generation of fungi and/or bacteria can be prevented.

The content of the water contained in the pigment ink of this embodiment is with respect to the total mass of the pigment ink, preferably 40 percent by mass or more, more preferably 50 percent by mass or more, and further preferably 60 percent by mass or more.

The pigment ink preferably contains no pigment dispersant. When the pigment ink contains a pigment dispersant, the viscosity of the ink is increased, and the ejection stability is degraded. In order to maintain the ejection stability, although the viscosity adjustment is required, when the pigment concentration is decreased for viscosity adjustment, the color development is degraded, and when the concentration of a moisturizer is decreased, the ejection stability is degraded.

The pigment ink preferably contains no water-soluble dye. The reason for this is that when the pigment ink contains a water-soluble dye, an acidic functional group derived from the self-dispersible pigment and a polyvalent metal salt derived from the dye react with each other, and as a result, pigment aggregates are generated. The aggregates described above may cause nozzle clogging in some cases.

The pigment ink preferably contains a water-soluble organic solvent. The water-soluble organic solvent described above is mainly used in order to prevent the precipitation from the ink at a front end of a recording head and the drying of the ink. Although the water-soluble organic solvent described above is not particularly limited, a solvent having a low volatile property and a high dye solubility is preferable, and for example, there may be mentioned a polyalkylene glycol such as a polyethylene glycol; an alkylene glycol, such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentqandiol, or hexylene glycol; glycerin; or a pyrrolidone, such as 2-pyrrolidone or N-methyl- 2-pyrrolidone. Those water-soluble organic solvents may be used alone, or at least two types thereof may be used in combination.

The content of the water-soluble organic solvent is preferably 5 to 40 percent by mass. When the content is less than 5 percent by mass, a moisturizing action becomes insufficient, and problems, such as the precipitation and/or the drying, may arise in some cases. When the content is more than 40 percent by mass, the viscosity of an aqueous ink for ink jet recording of the present disclosure is unfavorably increased, and as a result, problems may arise in some cases, that is, for example, the ejection may not be carried out, and/or the drying on recording paper may require an extraordinarily long time. The content of the water-soluble organic solvent is more preferably 7 to 40 percent by mass and further preferably 10 to 35 percent by mass.

In addition, in order to control the permeability, if needed, a polyvalent alcohol monoalkyl ether may also be used. Since effectively increasing a permeability rate of an ink into recording paper, the polyvalent alcohol monoalkyl ether improves a quick drying property of the ink on the paper and can prevent bleeding (blurring at the boundary between different colors) caused by a slow drying property on the recording paper and/or feathering (whisker blurring along fibers of paper) in association with the permeation. As the polyvalent alcohol monoalkyl ether, for example, there may be mentioned 1,2-hexanediol, diethylene glycol monomethyl ether, diethylene glycol monobutyl ether, diethylene glycol monoisobutyl ether, diethylene glycol monohexyl ether, diethylene glycol 2-ethylhexyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, or tripropylene glycol monobutyl ether.

The content of the polyvalent alcohol monoalkyl ether is preferably 0.3 to 15 percent by mass. When the content is less than 0.3 percent by mass, since the permeability rate of the ink into the recording paper is slow, problems in terms of drying time and blurring may arise in some cases. When the content is more than 15 percent by mass, since the permeability rate of the ink into the recording paper is excessively increased, the aqueous ink for ink jet recording of the present disclosure unfavorably reaches a rear side of the recording paper or causes blurring in some cases, and in addition, the amount of mist to be generated may be increased in some cases. The content of the polyvalent alcohol monoalkyl ether is more preferably 0.5 to 10 percent by mass. In addition, in order to control the permeability of the ink into the recording media and the drying property of the ink, a monovalent alcohol, such as ethanol or isopropyl alcohol, may also be used.

Although the basic structure of the pigment ink is as described above, in addition to those described above, if needed, for example, a resin binder, a dispersant, a surfactant, a viscosity adjuster, a surface tension adjuster, a pH adjuster, a dye solubilizer, an antiseptic agent/fungicide, and/or an antirust agent, each of which has been known in the past, may also be added.

1.2. Second Ink

The second ink is a dye ink containing water, a water-soluble dye, and a pigment dispersant. Since the dye ink according to this embodiment contains the pigment dispersant, even when the pigment ink and the dye ink are mixed together in a cap, the aggregation of the self-dispersible pigment contained in the pigment ink can be suppressed, and hence, aggregates are suppressed from being deposited in the cap. In particular, although the polyvalent metal salt derived from the dye promotes the aggregation of the self-dispersible pigment, on the other hand, the dispersant contained in the dye ink adsorbs on the pigment, and as a result, the dispersibility can be maintained.

The ink set according to this embodiment is not limited to use only one type of dye ink but may also use at least two types of dye inks. The at least two types of dye inks are not particularly limited, and for example, dye inks having different color phases or dye inks having different saturations or luminances may also be used. As the dye inks having different color phases, for example, inks, such as a cyan ink and a magenta ink, containing different types of dyes may be mentioned. As the dye inks having different saturations or luminances, for example, there may be mentioned inks, such as a cyan ink and a light cyan ink, in which although the color phases of the dyes contained therein are the same, the contents of the dyes in the inks are different from each other.

When the ink set contains a yellow ink, a magenta ink, a cyan ink, and a black ink, the yellow ink, the magenta ink, and the cyan ink are each preferably formed of a dye ink. Accordingly, a character and an image to be recorded on a recording medium each have an excellent recording quality.

As the water-soluble dye, a known water-soluble dye may also be used, and for example, a direct dye, an acidic dye, a basic dye, or a reactive dye may be mentioned.

The content of the water-soluble dye is with respect to the total mass of the dye ink, preferably 0.1 to 25 percent by mass, more preferably 1 to 20 percent by mass, and further preferably 1 to 15 percent by mass. When the content is less than 0.1 percent by mass, the color development may be inferior in some cases, and when the content is more than 25 percent by mass, the solubility in water may be insufficient, or the clogging recovery property may be degraded in some cases.

The pigment dispersant is preferably at least one selected from an acrylic copolymer, a polyoxyethylene oleyl ether, a polyoxyethylene distyrenated phenyl ether, a polyoxyethylene alkyl ether acid ester, a polyoxyethylene sorbitan monolaurate, a polyether phosphate, and sodium naphthalene sulfonate. The pigment dispersant is more preferably an acrylic-based resin or a polyalkylene oxide modified surfactant. Since those dispersants are not likely to be influenced by the polyvalent metal salt, the dispersion stability of the pigment can be secured under the presence of the polyvalent metal salt. As a result, the deposition of the pigment aggregates in the cap can be effectively suppressed.

As the water, pure water, such as ion-exchanged water, ultrafiltration water, reverse osmosis water, or distilled water, or water, such as ultrapure water, in which ionic impurities are removed as much as possible is preferable. In addition, when a pigment dispersion liquid or an ink using the same is stored for a long time, water sterilized by ultraviolet irradiation or addition of hydrogen peroxide is preferably used since the generation of fungi and/or bacteria can be prevented.

The content of the water contained in the dye ink according to this embodiment is with respect to the total mass of the dye ink, preferably 40 percent by mass or more and more preferably 50 percent by mass or more. In addition, a "water-soluble dye ink" in this specification indicates an ink containing 40 percent by mass or more of water with respect to the total mass of the dye ink.

The dye ink preferably contains no pigment nor dispersible dye containing a dispersant. The effect of the ink set according to this embodiment is that in the dye ink containing no dispersible dye, by the dispersant contained in the dye ink, the deposition of the aggregates in the cap can be effectively suppressed. In this embodiment, since the dye ink contains the pigment dispersant, the pigment aggregates are not likely to be generated, and as a result, the clogging of the nozzle can be suppressed as much as possible. In addition, in the dye ink, the color development is superior when the dye is only used as a color material, and the color becomes clear.

The dye ink described above preferably contains a water-soluble organic solvent as is the case of the above pigment ink. In addition, in the dye ink, for example, a resin binder, a dispersant, a surfactant, a viscosity adjuster, a surface tension adjuster, a pH adjuster, a dye solubilizer, an antiseptic agent/fungicide, and/or an antirust agent, each of which has been known in the past, may also be contained.

2. Ink Jet Recording Apparatus

An ink jet recording apparatus according to an embodiment of the present disclosure comprises a head member. Hereinafter, the ink jet recording apparatus according to this embodiment of the present disclosure will be described with reference to FIGS. 1 to 3. In addition, in the following drawings to be used for illustration, since the members are each shown to be recognized, the scale of each member is appropriately changed.

Figure 1:
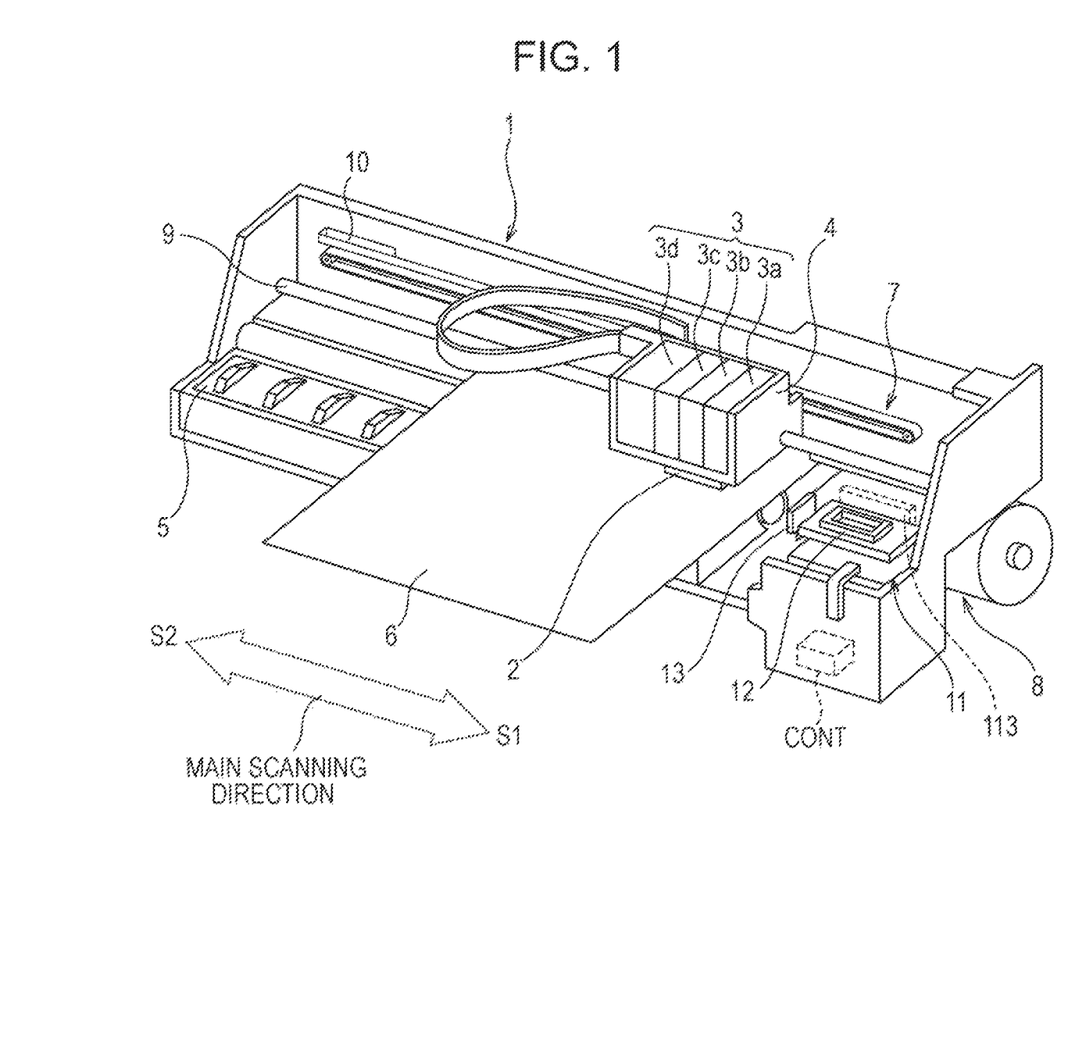
FIG. 1 is a perspective view showing the structure of an ink jet apparatus according to an embodiment.

FIG. 1 is a perspective view showing the structure of a printer 1 functioning as the ink jet recording apparatus according to this embodiment. In addition, this printer 1 is a serial printer.

As shown in FIG. 1, the printer 1 comprises a carriage 4 which mounts a recording head 2 and which also detachably carries an ink cartridge 3, a platen 5 which is disposed under the recording head 2 and which transports a recording medium 6, a carriage transfer mechanism 7 which transfers the carriage 4 in a medium width direction of the recording medium 6, and a medium feeding mechanism 8 which transports the recording medium 6 in a medium feeding direction. In addition, the printer 1 further comprises a control device CONT which controls the entire operation of the printer 1. In addition, the above medium width direction indicates a main scanning direction (head scanning direction). The above medium feeding direction indicates a sub-scanning direction (direction orthogonal to the main scanning direction).

The ink cartridge 3 according to this embodiment is formed of independent ink cartridges 3a, 3b, 3c, and 3d. In each of the ink cartridges 3a to 3d, the pigment ink or the dye ink described above is charged. In this embodiment, the pigment ink is charged in the ink cartridge 3a, and a first dye ink, a second dye ink, and a third dye ink are charged in the ink cartridges 3b, 3c, and 3d, respectively.

The order of the ink cartridges 3a to 3d thus disposed is not particularly limited and may be arbitrarily determined. In addition, the first dye ink, the second dye ink, and the third dye ink each correspond to the dye ink described above and have different color phases from each other.

The carriage 4 is fitted so as to be supported by a guide rod 9 which is a support member provided in the main scanning direction. In addition, the carriage 4 is configured to be transferred along the guide rod 9 in the main scanning direction by the carriage transfer mechanism 7.

A linear encoder 10 is a device which detects the position of the carriage 4 in the main scanning direction by a signal. The signal thus detected is configured to be sent as positional information to the control device CONT. The control device CONT recognizes a scanning position of the recording head 2 based on the positional information from this linear encoder 10 and controls a recording operation (ejection operation) and the like by the recording head 2. In addition, the control device CONT is configured to variably control a transfer rate of the carriage 4.

Figure 2:
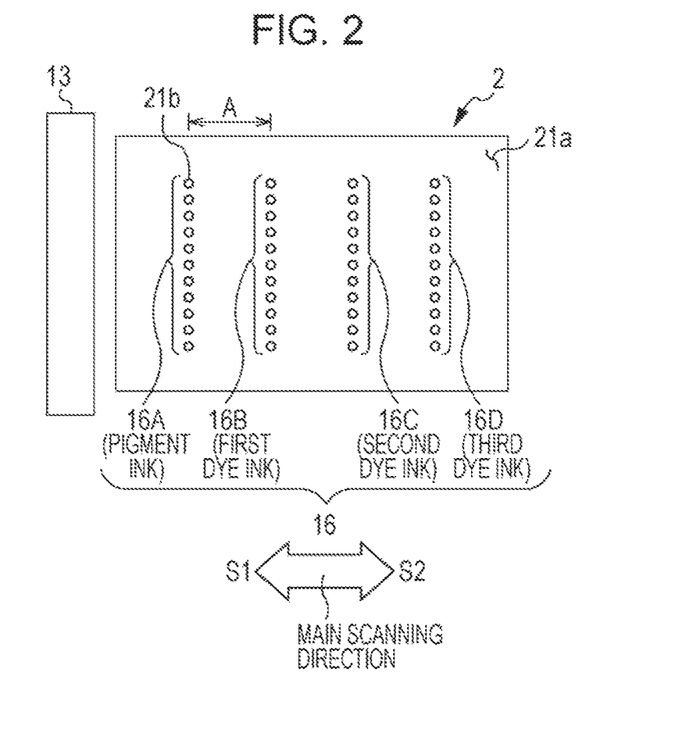
FIG. 2 is a schematic view showing one example of the arrangement of nozzles provided in a recording head.

FIG. 2 is a schematic view showing a nozzle plate 21a of the recording head 2 according to this embodiment. As shown in FIG. 2, the recording head 2 includes the nozzle plate 21a. In the nozzle plate 21a which functions as an ejection surface of the ink, a plurality of nozzle lines 16 is arranged. The nozzle lines 16 are each formed of ejection ports 21b each functioning as a nozzle hole through which the ink is to be ejected.

The nozzle lines 16 are configured so as to eject inks having, for example, different compositions between the nozzle lines. In the example shown in FIG. 2, four nozzle lines are provided so as to correspond to the respective ink compositions, and the nozzle lines are arranged along the main scanning direction. In particular, a nozzle line 16A which can eject the pigment dye, a nozzle line 16B which can eject the first dye ink, a nozzle line 16C which can eject the second dye ink, and a nozzle line 16D which can eject the third dye ink are provided.

In the example shown in FIG. 2, although the nozzle lines 16A to 16D provided in the nozzle plate 21a each extend in the direction orthogonal to the main scanning direction, the arrangement of the nozzle lines is not limited thereto, and the nozzle lines 16A to 16D may be provided in the nozzle plate 21a with a certain angle with respect to the direction orthogonal to the main scanning direction.

A distance A between the nozzle lines adjacent to each other is preferably 4 to 8 mm. The reason for this is that when the distance between the nozzle lines is small, by mixing between the pigment ink and the dye ink in the cap, the aggregates are disadvantageously liable to be deposited in the cap.

In a region out of the platen 5 in the transfer range of the recording head 2, a home position functioning as a scanning start point of the recording head 2 is provided. At this home position, a maintenance unit 11 including a cap 12 and a wiper 13 is provided.

Figure 3:
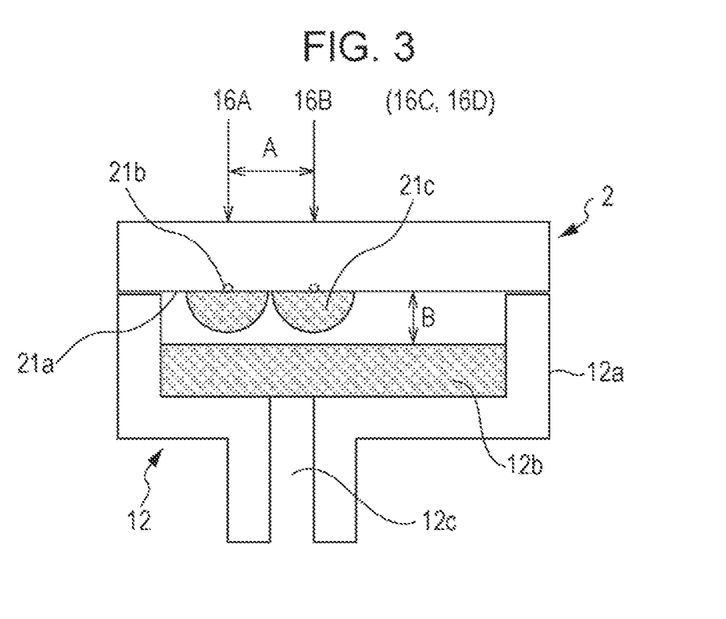
FIG. 3 is a view showing the structure of a cap.

FIG. 3 is a view showing the structure of the cap 12.

As shown in FIG. 3, the printer 1 according to this embodiment comprises the cap 12 configured to receive an ink to be discharged by ink jet cleaning or flushing. The cap 12 is configured to collectively cap the ejection ports 21b corresponding to the pigment ink and the dye inks. When the ink jet cleaning or the flushing is performed, the ink cartridge 3 is transferred so that the nozzle plate 21a of the recording head 2 faces the cap 12.

The cap 12 includes a cap main body 12a, an absorber 12b, and a waste ink suction port 12c. In the state in which the nozzle plate 21a and the cap 12 are disposed to face each other, a distance B between the nozzle plate 21a and the absorber 12b of the cap 12 is preferably 0.6 to 2.5 mm. When the distance B is more than 2.5 mm, during the cleaning, a large number of liquid pools is generated on the nozzle surface and may not be completely removed by wiping in some cases. When the distance B is less than 0.5 mm, the absorber which is swelled by absorption of the ink may be brought into contact with the head, and as a result, the head may be stained in some cases.

3. Examples

Hereinafter, although the present disclosure will be described in more detail with reference to Examples and Comparative Examples, the present disclosure is not limited to the following Examples.

3.1. Preparation of Pigment Ink

After materials were mixed together to obtain the compositions shown in the following Table 1, sufficient stirring was performed, so that pigment inks 1 to 5 each functioning as a black ink were prepared. In addition, in the following Table 1, the unit of the numerical value indicates percent by mass, and the total indicates 100.0 percent by mass. In addition, the numerical values of the pigment and the dispersant are each based on a solid component.

TABLE 1

|  | Pigment ink 1 Self-dispersible pigment | Pigment ink 2 Self-dispersible pigment | Pigment ink 3 Self-dispersible pigment | Pigment ink 4 Self-dispersible pigment | Pigment ink 5 Resin-dispersible pigment |
| --- | --- | --- | --- | --- | --- |
| Specific surface area (pNMR) | 10 m$^2$/g | 30 m$^2$/g | 55 m$^2$/g | 76 m$^2$/g | — |
| Pigment | 6.0% | 6.0% | 6.0% | 6.0% | 3.0% |
| Dispersant | — | — | — | — | 1.5% |
| Glycerin | 8.0% | 8.0% | 8.0% | 8.0% | 8.0% |
| Triethylene glycol | 3.5% | 3.5% | 3.5% | 3.5% | 3.5% |
| 1,2-hexanediol | 3.0% | 3.0% | 3.0% | 3.0% | 3.0% |
| 2-pyrrolidone | 2.0% | 2.0% | 2.0% | 2.0% | 2.0% |
| Surfynol104PG50 | 0.5% | 0.5% | 0.5% | 0.5% | 0.5% |
| OlefinE1010 | 1.0% | 1.0% | 1.0% | 1.0% | 1.0% |
| Triethanolamine | 0.5% | 0.5% | 0.5% | 0.5% | 0.5% |
| EDTA | 0.02% | 0.02% | 0.02% | 0.02% | 0.02% |
| Pure water | Balance | Balance | Balance | Balance | Balance |
| Total | 100% | 100% | 100% | 100% | 100% |

In the pigment inks 1 to 5, the following self-dispersible pigments and resin-dispersible pigment were used.

Self-Dispersible Pigment

After 500 g of a carbon black raw powder (primary particle diameter: 18 nm, BET specific surface area: 180 m$^2$/g, DBP oil absorption: 186 ml/100 g) prepared by a furnace method was added to 3,750 g of ion-exchanged water, while stirring was performed by a dissolver, the temperature of the mixture thus prepared was increased to 50° C. Subsequently, while pulverization was performed by a sand mill using zirconia beads having a diameter of 0.8 mm, an aqueous solution of sodium hypochlorite (effective chlorine concentration: 12%) was dripped at 50° C. to 60° C. for 3.5 hours. The pulverization using the sand mill was further continuously performed for 30 minutes, so that a reaction liquid containing a self-dispersible carbon black was obtained. This reaction liquid was filtrated with a 400-mesh metal net, so that the zirconia beads and an unreacted carbon black were separated from the reaction liquid. A potassium hydroxide aqueous solution at a concentration of 5% was added to the reaction liquid thus obtained by the separation, so that the pH was adjusted to 7.5. Next, desalting and refining were performed using an ultrafiltration membrane until the electrical conductivity of the liquid reached 1.5 mS/cm. By the use of an electrodialysis apparatus, the desalting and the refining were further performed until the electrical conductivity of the liquid reached 1.0 mS/cm. The liquid thus obtained was condensed so that the concentration of the self-dispersible carbon black was 17 percent by weight. After coarsely large particles were removed from this condensed liquid by a centrifugal machine, filtration was performed using a 0.6-μm filter. Ion-exchanged water was added to a filtrate thus obtained for dilution and dispersion until the concentration of the self-dispersible carbon black reached 15 percent by weight, and a dispersion liquid of the self-dispersible carbon black was obtained.

The amount of the aqueous solution of sodium hypochlorite (effective chlorine concentration: 12%) to be dripped was adjusted so that the specific surface area calculated from the measurement by a pulse NMR coincided with the value shown in Table 1.

Resin-Dispersible Pigment

After 10 parts by mass of an ammonium salt of a styrene-acrylic acid copolymer (weight average molecular weight: 10,000, polymer component: 15%) functioning as a dispersant and 80 parts by mass of ion-exchanged water were added to 10 parts by mass of a carbon black functioning as the pigment, sufficient mixing was performed, and the mixture thus obtained was dispersed in a sand mill (manufactured by Yasukawa Seisakusho Co., Ltd.) together with glass beads (diameter: 1.7 mm, 1.5 times the mass of the mixture) for 2 hours. After the dispersion treatment, the glass beads were removed, so that the resin-dispersible pigment shown in Table 1 was obtained.

The specific surface area shown in Table 1 was a value calculated from the measurement by a pulse NMR and was measured as described below.

Measurement Conditions
  Pulse NMR: Acorn Drop manufactured by Xigo nano-tools Inc.
  Measurement temperature: 30° C.
  Measurement sample: 0.5 mL
  Measurement sample A1: aqueous pigment ink
  Measurement sample A2: supernatant liquid obtained by centrifugal separation (415,000 G×60 minutes, 25° C.) of the measurement sample A1

$$Sp = \{[(Rav/Rb)-1] \times Rb\}/(0.0016 \times \Psi p)$$

(In the formula, Sp indicates the specific surface area [m$^2$/g] of the pigment in the ink composition, Rav indicates a reciprocal number of the measurement value by the pulse NMR obtained using the measurement sample A1, Rb indicates a reciprocal number of the measurement value by the pulse NMR obtained using the measurement sample A2, and Ψp is obtained by calculation of the following formula.)

$$\Psi p = (Sc/Sd)/[(1-Sc)/Td]$$

(In the formula, Sc indicates a pigment solid component concentration (percent by mass) of the measurement sample A1, Sd indicates the density of the pigment of the measurement sample A1, and Td indicates the density of the supernatant liquid of the measurement sample A2.)

In addition, Sc: pigment solid component concentration, Sd: density of pigment (carbon black: approximately 1.7), and Td: density of the supernatant liquid (water: 1.0) were each obtained by calculation from the composition of the aqueous pigment ink.

3.2. Preparation of Dye Ink

After materials were mixed together at the composition shown in the following Table 2, sufficient stirring was performed, so that dye inks 1 to 10 each functioning as a magenta ink were prepared. In addition, in the following Table 2, the unit of the numerical value indicates percent by mass, and the total indicates 100.0 percent by mass.

In the dye inks 1 to 10, the following was used as the dispersant.

Dispersant

Disper BYK2012 (BYK Japan KK), solid component: 40%
Emulgen 430 (Kao Corporation), solid component: 100%
Emulgen A-60 (Kao Corporation), solid component: 100%
Plysurf A208F (DKS Co., Ltd.) solid component: 99%
Sorgen TW-20 (DKS Co., Ltd.) solid component: 100%
TEGO Disperse 650 (TEGO) solid component: 100%
Loma D (San Nopco Limited) solid component: 80%

TABLE 2

|  | Dye ink 1 | Dye ink 2 | Dye ink 3 | Dye ink 4 | Dye ink 5 |
| --- | --- | --- | --- | --- | --- |
| Type of dispersant | — | DisperBYK Acrylic copolymer | Emulgen430 Polyoxyethylene oleyl ether | EmulgenA-60 Polyoxyethylene distyrenated phenyl ether | PlysurfA208 F Phosphoric acid-type anionic surfactant |
| Dispersant | — | 1.5% | 1.5% | 1.5% | 1.5% |
| Dye (A) | 6.0% | 6.0% | 6.0% | 6.0% | 6.0% |
| Glycerin | 10.0% | 10.0% | 10.0% | 10.0% | 10.0% |
| Triethylene glycol | 7.0% | 2.0% | 2.0% | 2.0% | 2.0% |
| 2-pyrrolidone | 3.0% | 3.0% | 3.0% | 3.0% | 3.0% |
| TEGmBE | 10.0% | 10.0% | 10.0% | 10.0% | 10.0% |
| OlefinE1010 | 0.3% | 0.3% | 0.3% | 0.3% | 0.3% |
| Surfynol104PG50 | 0.3% | 0.3% | 0.3% | 0.3% | 0.3% |
| Triethanolamine | 0.5% | 0.5% | 0.5% | 0.5% | 0.5% |
| Pure water | Balance | Balance | Balance | Balance | Balance |
| Total | 100% | 100% | 100% | 100% | 100% |

|  | Dye ink 6 | Dye ink 7 | Dye ink 8 | Dye ink 9 | Dye ink 10 |
| --- | --- | --- | --- | --- | --- |
| Type of dispersant | SorgenTW-20 Polyoxyethylene sorbitan monolaurate | TEGO dispers 650 Styrene/ ethylene oxide copolymer | LomaD Sodium naphthalene sulfonate | DisperBYK Acrylic copolymer | DisperBYK Acrylic copolymer |
| Dispersant | 1.5% | 1.5% | 1.5% | 1.0% | 0.5% |
| Dye (A) | 6.0% | 6.0% | 6.0% | 6.0% | 6.0% |
| Glycerin | 10.0% | 10.0% | 10.0% | 10.0% | 10.0% |
| Triethylene glycol | 2.0% | 2.0% | 2.0% | 2.0% | 2.0% |
| 2-pyrrolidone | 3.0% | 3.0% | 3.0% | 3.0% | 3.0% |
| TEGmBE | 10.0% | 10.0% | 10.0% | 10.0% | 10.0% |
| OlefinE1010 | 0.3% | 0.3% | 0.3% | 0.3% | 0.3% |
| Surfynol104PG50 | 0.3% | 0.3% | 0.3% | 0.3% | 0.3% |
| Triethanolamine | 0.5% | 0.5% | 0.5% | 0.5% | 0.5% |
| Pure water | Balance | Balance | Balance | Balance | Balance |
| Total | 100% | 100% | 100% | 100% | 100% |

The chemical structure of the dye (A) used for preparation of the dye inks 1 to 10 is shown below.

[Chem. 1]

M = Na or NH$_4$

3.3. Ink Set

The inks obtained as described above were used in combination as shown in Tables 3 and 4 to form ink sets.

TABLE 3

|  | Example 1 | Example 2 | Example 3 | Example 4 | Example 5 |
| --- | --- | --- | --- | --- | --- |
| Pigment ink Dye ink | Pigment ink 1 Dye ink 2 | Pigment ink 2 Dye ink 2 | Pigment ink 3 Dye ink 2 | Pigment ink 4 Dye ink 2 | Pigment ink 2 Dye ink 3 |
| Distance (head to absorber) | 1.0 mm | 1.0 mm | 1.0 mm | 1.0 mm | 1.0 mm |
| Black color development (regular paper) | A | A | A | B | A |
| Ink storage stability (pigment ink) | B | A | A | A | A |
| Presence or absence of deposition in cap | A | A | A | A | A |
| Clogging recovery property | A | A | A | A | A |
| Cleaning applicability (dye ink) | A | A | A | A | A |
| Cleaning applicability (pigment ink) | A | A | A | A | A |

|  | Example 6 | Example 7 | Example 8 | Example 9 |
| --- | --- | --- | --- | --- |
| Pigment ink Dye ink | Pigment ink 2 Dye ink 4 | Pigment ink 2 Dye ink 5 | Pigment ink 2 Dye ink 6 | Pigment ink 2 Dye ink 7 |
| Distance (head to absorber) | 1.0 mm | 1.0 mm | 1.0 mm | 1.0 mm |
| Black color development (regular paper) | A | A | A | A |
| Ink storage stability (pigment ink) | A | A | A | A |
| Presence or absence of deposition in cap | A | A | A | A |
| Clogging recovery property | A | A | A | A |
| Cleaning applicability (dye ink) | A | A | A | A |
| Cleaning applicability (pigment ink) | A | A | A | A |

TABLE 4

|  | Example 10 | Example 11 | Example 12 | Example 13 |
|---|---|---|---|---|
| Pigment ink Dye ink | Pigment ink 2<br>Dye ink 8 | Pigment ink 2<br>Dye ink 9 | Pigment ink 2<br>Dye ink 10 | Pigment ink 2<br>Dye ink 2 |
| Distance (head to absorber) | 1.0 mm | 1.0 mm | 1.0 mm | 0.6 mm |
| Black color development (regular paper) | A | A | A | A |
| Ink storage stability (pigment ink) | A | A | A | A |
| Presence or absence of deposition in cap | C | A | B | A |
| Clogging recovery property | C | A | B | A |
| Cleaning applicability (dye ink) | A | A | A | A |
| Cleaning applicability (pigment ink) | A | A | A | A |

|  | Example 14 | Example 15 | Comparative example 1 | Comparative example 2 |
|---|---|---|---|---|
| Pigment ink Dye ink | Pigment ink 2<br>Dye ink 2 | Pigment ink 2<br>Dye ink 2 | Pigment ink 2<br>Dye ink 1 | Pigment ink 5<br>Dye ink 1 |
| Distance (head to absorber) | 2.0 mm | 2.5 mm | 1.0 mm | 1.0 mm |
| Black color development (regular paper) | A | A | A | C |
| Ink storage stability (pigment ink) | A | A | A | A |
| Presence or absence of deposition in cap | A | A | D | A |
| Clogging recovery property | A | A | D | D |
| Cleaning applicability (dye ink) | A | B | A | A |
| Cleaning applicability (pigment ink) | A | B | A | A |

3.4. Evaluation of Ink Set

The ink sets of Examples and Comparative Examples shown in Tables 3 and 4 were evaluated in accordance with the following evaluation items.

Black Color Development

After a pattern of JEITA CP3901B was formed on regular paper X4200 using EW-EW660FT as a printer, colorimetry was performed by the use of i1 (manufactured by X-Rite). In addition, in the printer, color correction was not performed. Based on the OD value at the maximum duty of black, the black color development was evaluated as described below.
  A: 1.2 or more
  B: 1.1 to less than 1.2
  C: less than 1.1

Storage Stability of Ink

After 100 g of the ink was sealed in an aluminum pack, this pack was left in a constant-temperature bath at 70° C. for 6 days. The ink was recovered from the constant-temperature bath and was then diluted by 5,000 times with pure water. The particle diameter of this diluted ink liquid was measured using Nanotrac (manufactured by Nikkiso Co., Ltd.). Based on the value of the average particle diameter thus obtained, the storage stability of the ink was evaluated as described below.
  A: −20 to 20 nm
  B: 20 to less than 50 nm
  C: 50 nm or more Presence or Absence of Deposition in Cap By the use of a printer EWM770, in an environment at 30° C., printing was performed for 10 hours at a pace of 8 sheets per hour. The pattern was set in accordance with that of newsletter. The cap was observed at regular intervals, and the presence or absence of an ink solid component was confirmed. Based on a period in which the deposition was generated, the presence or absence of the deposition in the cap was evaluated as described below.
  A: No deposition is observed for 4 months or more.
  B: Deposition is confirmed from 3 months to less than 4 months.
  C: Deposition is confirmed from 2 months to less than 3 months.
  D: Deposition is confirmed within 2 months.

Clogging Recovery Property

After the ink was charged in a printer EWM770, a nozzle check pattern was printed, and no nozzle missing was confirmed. Subsequently, a carriage which was not received in a cap was left for one week at 40° C. Cleaning was performed, so that all nozzles were recovered from clogging. Based on the number of cleanings required for recovery from clogging, the clogging recovery property was evaluated as described below.
  A: 1 time or less
  B: 2 to 3 times
  C: 4 to 5 times
  D: 6 times or more Cleaning Applicability After the ink set was mounted in a printer EWM770, in a printing environment at 30° C., cleaning was performed 50 times, and the nozzle check pattern was printed at each cleaning. Based on the rate of the number in which the ejection was performed from all the nozzles to 50 times, the cleaning applicability was evaluated as described below.
  A: 80% to 100%
  B: less than 80%

By the ink sets of Examples, the deposition of the aggregates in the cap was suppressed, and the optical density of the pigment ink was high. In Comparative Example 1, since the dye ink containing no dispersant was used, although the nozzle clogging was suppressed, the deposition of the pigment aggregates in the cap was generated. In Comparative Example 2, since the resin-dispersible pigment was used, in order to suppress the increase in viscosity of the pigment ink, a moisturizer was required to be contained, and as a result, the pigment concentration was decreased, and the color development was degraded.

In addition, from the results of Examples 1 to 4, it was found that when the specific surface area of the self-dispersible pigment of the pigment ink was from 10 to 76 $m^2/g$, in particular, from 10 to 55 $m^2/g$, the black color development was improved.

In addition, from the results of Examples 2, 11, and 12, it was found that when the amount of the dispersant contained in the dye ink was large, such as 1.0% or more, the deposition in the cap could be suppressed.

From the results of Examples 1 and 13 to 15, it was found that when the distance between the nozzle plate and the absorber was excessively large, the cleaning applicability was degraded. The reason for this is believed that some ink droplets do not reach the absorber during the cleaning and adhere to the nozzle plate in the form of mist.

What is claimed is:

1. An ink set which includes
a first ink; and
a second ink,
wherein the ink set is used for an ink jet recording apparatus which comprises:
a recording head having at least one first ejection port which ejects the first ink and at least one second ejection port which ejects the second ink; and
a cap which collectively caps the first ejection port and the second ejection port,
the first ink contains water and a self-dispersible pigment,
the second ink contains water, a water-soluble dye, and a pigment dispersant, and
wherein the self-dispersible pigment of the first ink has a specific surface area of 10 to 30 $m^2/g$.

2. The ink set according to claim 1,
wherein the self-dispersible pigment is a carbon black.

3. The ink set according to claim 1,
wherein the first ink contains no pigment dispersant.

4. The ink set according to claim 1,
wherein the first ink contains no water-soluble dye.

5. The ink set according to claim 1,
wherein the pigment dispersant includes at least one selected from an acrylic copolymer, a polyoxyethylene oleyl ether, a polyoxyethylene distyrenated phenyl ether, a polyoxyethylene alkyl ether acid ester, a polyoxyethylene sorbitan monolaurate, a polyether phosphate, and sodium naphthalene sulfonate.

6. The ink set according to claim 1,
wherein the pigment dispersant includes an acrylic-based resin or a polyalkylene oxide modified surfactant.

7. The ink set according to claim 1,
wherein the second ink contains no pigment nor dispersible dye.

8. The ink set according to claim 1,
wherein in the recording head, the first ejection ports are disposed to form a first nozzle line, and the second ejection ports are disposed to form a second nozzle line, and
the distance between the first nozzle line and the second nozzle line is 4 to 8 mm.

9. The ink set according to claim 1,
wherein the cap comprises an absorber.

10. The ink set according to claim 9,
wherein in the recording head, the first ejection port and the second ejection port are provided in a nozzle plate, and
the distance between the nozzle plate and the absorber of the cap is 0.6 to 2.5 mm.

11. An ink jet recording apparatus in which an ink set including a first ink and a second ink is mounted and which ejects the first ink and the second ink, the ink jet recording apparatus comprising:
a recording head having a first ejection port which ejects the first ink and a second ejection port which ejects the second ink; and
a cap which collectively caps the first ejection port and the second ejection port,
wherein the first ink contains water and a self-dispersible pigment, the self-dispersible pigment of the first ink having a specific surface area of 10 to 30 $m^2/g$ and
the second ink contains water, a water-soluble dye, and a pigment dispersant.

* * * * *